US012692387B2

(12) United States Patent
Licata et al.

(10) Patent No.: US 12,692,387 B2
(45) Date of Patent: Jul. 28, 2026

(54) MASTERBATCH OF HIGHLY LOADED AMORPHOUS PHA DISPERSED IN AMORPHOUS OR SEMI-CRYSTALLINE POLYMER AND METHOD OF PRODUCING THE SAME

(71) Applicant: CJ CHEILJEDANG CORPORATION, Seoul (KR)

(72) Inventors: John Licata, Woburn, MA (US); Allen Padwa, Worcester, MA (US)

(73) Assignee: CJ CHEILJEDANG CORPORATION, Seoul (KR)

( * ) Notice: Subject to any disclaimer, the term of this patent is extended or adjusted under 35 U.S.C. 154(b) by 168 days.

(21) Appl. No.: 18/191,608

(22) Filed: Mar. 28, 2023

(65) Prior Publication Data

US 2023/0312917 A1 Oct. 5, 2023

Related U.S. Application Data

(60) Provisional application No. 63/325,226, filed on Mar. 30, 2022.

(51) Int. Cl.
*C08L 67/04* (2006.01)
*C08J 3/00* (2006.01)

(52) U.S. Cl.
CPC .............. *C08L 67/04* (2013.01); *C08J 3/005* (2013.01); *C08J 2367/04* (2013.01); *C08J 2467/04* (2013.01); *C08L 2203/30* (2013.01); *C08L 2205/025* (2013.01); *C08L 2205/12* (2013.01); *C08L 2310/00* (2013.01)

(58) Field of Classification Search
None
See application file for complete search history.

(56) References Cited

U.S. PATENT DOCUMENTS

| | | | |
|---|---|---|---|
| 6,228,934 B1 | 5/2001 | Horowitz et al. | |
| 8,231,954 B2 | 7/2012 | Li et al. | |
| 9,034,989 B2 | 5/2015 | Padwa et al. | |
| 9,650,513 B2 | 5/2017 | Krishnaswamy et al. | |
| 10,428,189 B2 | 10/2019 | Smink et al. | |
| 11,091,632 B2 | 8/2021 | Andrews et al. | |
| 2002/0141967 A1* | 10/2002 | Williams | C12P 7/625 424/78.37 |
| 2013/0225761 A1 | 8/2013 | Whitehouse | |
| 2015/0132512 A1 | 5/2015 | Krishnaswamy et al. | |
| 2018/0258237 A1 | 9/2018 | Smink et al. | |
| 2018/0334564 A1 | 11/2018 | Andrews et al. | |

FOREIGN PATENT DOCUMENTS

| | | | |
|---|---|---|---|
| KR | 10-2006-0044925 A | 5/2006 | |
| KR | 10-2008-0112980 A | 12/2008 | |
| KR | 10-2011-0038642 A | 4/2011 | |
| KR | 10-2021-0111187 A | 9/2021 | |

OTHER PUBLICATIONS

Leistritz Extrusion Technology, "Process studies and test results for PLA and PHA grade bioplastics", Leistritz Twin Screw Technical Article, https://extruders.leistritz.com, last visited Mar. 27, 2023, pp. 1-6.

* cited by examiner

*Primary Examiner* — Robert S Jones, Jr.
*Assistant Examiner* — Lily K Sloan
(74) *Attorney, Agent, or Firm* — Sughrue Mion, PLLC

(57) ABSTRACT

An amorphous or semi-crystalline polymer/aPHA composition (masterbatch) has a high load of aPHA (30 to 50 wt % based on the total amount of the composition). A method for production of the composition includes two or more split feedings of the aPHA in a blending or mixing or compounding operation. The method includes feeding about 1-15 weight percent (wt %) of the total aPHA in a primary feed hopper of a blending or mixing or compounding apparatus and about 30-49 weight percent downstream in the process.

5 Claims, 2 Drawing Sheets

FIG. 2

MASTERBATCH OF HIGHLY LOADED AMORPHOUS PHA DISPERSED IN AMORPHOUS OR SEMI-CRYSTALLINE POLYMER AND METHOD OF PRODUCING THE SAME

CROSS REFERENCE TO RELATED APPLICATIONS

This application claims benefit to U.S. Provisional Application No. 63/325,226 filed Mar. 30, 2022, the content of which is incorporated herein by reference in its entirety.

FIELD OF THE DISCLOSURE

The present disclosure relates to a masterbatch of a highly loaded amorphous polyhydroxyalkanoate (aPHA) dispersed in an amorphous or semi-crystalline polymer, for addition as an impact modifier and bio-degradation accelerant, and a method of producing the same.

BACKGROUND OF THE DISCLOSURE

Biodegradable plastics are of increasing industrial interest as replacements or supplements for non-biodegradable plastics in a wide range of applications and in particular for packaging applications. One class of biodegradable polymers is the polyhydroxyalkanoates (PHAs), which are linear, aliphatic polyesters that can be produced by numerous microorganisms for use as intracellular storage material. Articles made from the polymers are generally recognized by soil microbes as a food source. There has therefore been a great deal of interest in the commercial development of these polymers, particularly for disposable consumer items. The polymers exhibit good biodegradability and useful physical properties.

Molecular weight, molecular weight distribution, and long chain branching are the dominating factors influencing processing and key physical properties of any polymeric composition.

Polyhydroxyalkanoate (PHA) polymers have quite limited thermal stability, and undergo chain scission by beta-elimination mechanisms at general processing temperatures and conditions. This can reduce the molecular weight quite significantly which is undesirable for certain applications, because of the low melt strength or melt elasticity. To build up effective molecular weight of PHA polymers and increase melt strength of PHA polymers, U.S. Pat. No. 9,034,989 discloses a method of branching a starting PHA by reacting the starting PHA with a branching agent and a cross-linking agent. The entire content of U.S. Pat. No. 9,034,989 is incorporated by reference herein.

U.S. Pat. Nos. 9,650,513 and 11,091,632 describe compositions of branched polymer compositions comprising PHAs and either poly(butylene succinate) (PBS) or polybutylene succinate adipate (PBSA) or combinations to improve and/or adjust physical, chemical, and/or mechanical properties of biodegradable polymers. The entire contents of U.S. Pat. Nos. 9,650,513 and 11,091,632 are incorporated by reference herein.

Blends of two or more biopolymers provide a combination of properties that are not found in a single polymer or co-polymer. There are a number of ways to blend biopolymers together successfully. A common method is to use twin-screw extrusion (TSE) to melt two or more biopolymer resins together and to then extrude the molten biopolymer resin blend into a strand that is cooled and fed into a pelletizer for producing an array of pelletized pieces called a masterbatch. A TSE motor transmits power into the gearbox/shafts and rotating screws impart shear and energy into the materials being processed. TSEs utilize modular barrels, and segmented screws are assembled on splined shafts, allowing a wide range and refinement of many process system configurations and applications.

Bio-based plastic materials tend to be heat and shear sensitive as compared to traditional plastics, and generally need to be compounded with modifiers, fillers, additives and other polymers based upon the required functionality of the final product. Elevated melt temperatures and high shear stresses must be managed in the extrusion process section to minimize molecular weight loss and maintain mechanical properties.

Masterbatch is commonly used to deliver additives that improve properties and/or value of polymer products into extrusion applications. Typically, a masterbatch is a concentrate of an additive(s) dispersed in a polymer. Classic rubber toughening requires an elastomeric material be dispersed into an amorphous or semi-crystalline polymer using high shear. It can be difficult to reach high percentage (%) concentrates particularly when a low-melting component is present at a fairly large concentration (>30%).

Amorphous polyhydroxyalkanoate (aPHA) may be compounded into other polymers in a blending or compounding equipment such as twin-screw extruder to a desired concentration. Because of the excessive shear needed, it can be challenging to minimize the molecular weight (MW) loss associated with the process. Also, with aPHA having a much lower flow temperature compared to other polymers such as polylactic acid (PLA), it tends to go to the wall of the extruder and start to encapsulate the higher-melting and major component polymer such as PLA. In such circumstances, it is not easy to create a phase inversion to produce a masterbatch comprising a high content of aPHA dispersed in a crystalline polymer. The inventors found it is challenging to balance the heat load in an extruder while maintaining high aPHA loading and minimizing residence time, during which degradation of aPHA can occur. Therefore, there are needs for an improved method and/or apparatus to produce a masterbatch containing a high load of aPHA dispersed in a polymer without molecular weight loss.

SUMMARY OF THE DISCLOSURE

An aspect of the present disclosure is directed to a method of producing a blend of amorphous or semi-crystalline polymer and aPHA (also referred to as masterbatch or masterbatch composition) having a high load of aPHA. In an aspect, the aPHA content is about 30 to 50 wt %, or about 35 to 49 wt %, or about 40 to 48 wt %, or about 42 to 47 wt %, or about 43 to 46 wt % based on a total weight of a blend of aPHA and an amorphous or semi-crystalline polymer. The method comprises two or more split feedings of the aPHA in a mixing or blending or compounding operation. The method comprises providing about 1-15 weight percent (wt %), or about 5-15 wt %, or about 10-15 wt % of aPHA based on the sum of total aPHA and total amorphous or semi-crystalline polymer in the masterbatch to a primary feed (sometimes referred to as "first feed") and providing about 30-49 wt %, or about 30-45 wt %, or about 35-45 wt % of aPHA based on the sum of total aPHA and total amorphous or semi-crystalline polymer in the masterbatch to a secondary feed (sometimes referred to as "second feed") which is physically separated from the primary feed and downstream in the process. The weight ratio of the first feed of aPHA to the second feed of aPHA is 1:2-5, or 1:2-4, or 1:3-4, or 1:3.5, or 1:4, or 1:3, or 1:2. The second feed of aPHA is fed into the primary feed in a molten (melted) state. When the process includes more than two splits of aPHA feed, the second and subsequent splits of aPHA are fed into the primary feed in a molten (melted) state. The weight ratio of the first feed of aPHA to the second and the subsequent feed of aPHA is 1:2-5, or 1:2-4, or 1:3-4, or 1:3.5, or 1:4, or 1:3, or 1:2. In a non-limiting exemplary embodiment employing a blending apparatus such as a screw extruder having, for example, 10-12 barrels, the primary feed is made at the first barrel and the second feed is anywhere between 5$^{th}$ and 8$^{th}$ barrel.

In an aspect of the present disclosure, provided is a method of producing a masterbatch comprising an amorphous or semi-crystalline polymer and amorphous polyhydroxyalkanoate (aPHA) dispersed in the amorphous or semi-crystalline polymer, the method comprising:

feeding the amorphous or semi-crystalline polymer and about 1-15 wt % of aPHA based on a sum of total aPHA and total amorphous or semi-crystalline polymer in the masterbatch to a primary feed;

melting the primary feed;

feeding about 30-49 wt % of aPHA based on the sum of total aPHA and total amorphous or semi-crystalline polymer in the masterbatch to a secondary feed that is physically separated from the primary feed to combine the secondary feed and the melted primary feed, and dispersing aPHA of the secondary feed in the melted primary feed. In a non-limiting exemplary embodiment, the secondary feed may be a side feed.

In one embodiment, the present disclosure relates to an amorphous or semi-crystalline polymer/aPHA composition (masterbatch) containing about 30-50 wt % of aPHA, or about 35-49 wt %, or about 40 to 48 wt %, or about 42 to 47 wt %, or about 43 to 46 wt %, based on the total weight of the masterbatch composition.

The amorphous or semi-crystalline polymer may be, but not limited to, polylactic acid (PLA), polybutylene succinate (PBS), aliphatic-aromatic polyesters such as polybutylene adipate terephthalate (PBAT), crystalline polyhydroxyalkanoate (PHA), polyethylene-succinate (PES), polycaprolactone (PCL), or a combination thereof.

The above masterbatch composition can be incorporated in traditional thermoplastic processing for producing polymer products including injection molding, extrusion (blown, cast and oriented film, sheet, profile, etc.), fibers, spunbond fabrics, monofilaments, thermoforming, blow molding, compression molding and other thermoplastic processing operations.

The present disclosure also relates to a method of preparing an amorphous or semi-crystalline polymer product comprising adding the above amorphous or semi-crystalline polymer/amorphous polyhydroxyalkanoate (aPHA) masterbatch into an amorphous or semi-crystalline polymer to obtain a mixture and subjecting the mixture to injection molding, extrusion (blown, cast and oriented film, sheet, profile, etc.), thermoforming, blow molding, compression molding and other thermoplastic processing operations.

In one embodiment, the method comprises producing a PLA/aPHA masterbatch using two or more split feedings of the aPHA in a mixing or blending or compounding operation. The method comprises feeding an entire amount of PLA and about 1-15 wt %, or about 5-15 wt %, or about 10-15 wt % of aPHA based on the sum of total aPHA and total PLA in the masterbatch in a primary feed; melting the primary feed; feeding about 30-49 wt %, or about 30-45 wt %, or about 35-45 wt % of aPHA based on the sum of total aPHA and total PLA in the masterbatch to a secondary feed that is physically separated from the primary feed to combine the secondary feed and the melted primary feed; and dispersing aPHA of the secondary feed in the melted primary feed to obtain a masterbatch in which discrete aPHA particles are dispersed in the PLA. The method optionally further comprises cooling the masterbatch. In an aspect, the melting is carried out at a temperature range of 155-220° C., or 166-210° C., 175-195° C. In an aspect, the dispersing is carried out at a temperature lower than the temperature of the melting step, for example, a temperature range of 140-180° C., or 145-170° C., or 150-160° C.

In one embodiment, the present disclosure relates to a PLA/aPHA composition (masterbatch) containing about 30-50 wt % of aPHA, or about 35-49 wt %, or about 40 to 48 wt %, or about 42 to 47 wt %, or about 43 to 46 wt %, based on the total amount of the masterbatch composition.

The above PLA/aPHA masterbatch composition can be incorporated in traditional thermoplastic processing for producing PLA products including injection molding, extrusion (blown, cast and oriented film, sheet, profile, etc.), fibers, spunbond fabrics, monofilaments, thermoforming, blow molding, compression molding and other thermoplastic processing operations.

In one embodiment, the method comprises producing a polybutylene succinate (PBS)/aPHA masterbatch using two or more split feedings of the aPHA in a mixing or blending or compounding operation. The method comprises feeding an entire amount of PBS and about 1-15 wt %, or about 5-15 wt %, or about 10-15 wt % of aPHA based on the sum of total aPHA and total PBS in the masterbatch in a primary feed; melting the primary feed; feeding about 30-49 wt %, or about 30-45 wt %, or about 35-45 wt % of aPHA based on the sum of total aPHA and total PBS in the masterbatch to a secondary feed that is physically separated from the primary feed to combine the secondary feed and the melted primary feed; and dispersing aPHA of the secondary feed in the melted primary feed to obtain a masterbatch in which discrete aPHA particles are dispersed in the PBS. The method optionally further comprises cooling the masterbatch. In an aspect, the melting is carried out at a temperature range of 140-200° C., or 150-190° C., or 160-180° C. In an aspect, the dispersing is carried out at a temperature lower than the temperature of the melting step, for example, a temperature range of 130-180° C., or 140-170° C., or 150-160° C.

In one embodiment, the present disclosure relates to a PBS/aPHA composition (masterbatch) containing about 30-50 wt % of aPHA, or about 35-49 wt %, or about 40 to 48 wt %, or about 42 to 47 wt %, or about 43 to 46 wt %, based on the total amount of the masterbatch composition.

The above PBS/aPHA masterbatch composition can be incorporated in traditional thermoplastic processing for producing PBS products including injection molding, extrusion (blown, cast and oriented film, sheet, profile, etc.), fibers, spunbond fabrics, monofilaments, thermoforming, blow molding, compression molding and other thermoplastic processing operations.

In one embodiment, the method comprises producing a polybutylene adipate terephthalate (PBAT)/aPHA masterbatch using two or more split feeding of the aPHA in a mixing or blending or compounding operation. The method comprises feeding an entire amount of PBAT and about 1-15 wt %, or about 5-15 wt %, or about 10-15 wt % of aPHA based on the sum of total aPHA and total PBAT in the masterbatch in a primary feed; melting the primary feed;

feeding and about 30-49 wt %, or about 30-45 wt %, or about 35-45 wt % of aPHA based on the sum of total aPHA and total PBAT in the masterbatch to a secondary feed that is physically separated from the primary feed to combined the secondary feed and the melted primary feed; and dispersing aPHA of the secondary feed in the melted primary feed to obtain a masterbatch in which discrete aPHA particles are dispersed in the PBAT. The method optionally further comprises cooling the masterbatch. In an aspect, the melting is carried out at a temperature range of 140-200° C., or 150-190° C., or 160-180° C. In an aspect, the dispersing is carried out at a temperature lower than the temperature of the melting step, for example, a temperature range of 130-180° C., or 140-170° C., or 150-160° C.

In one embodiment, the present disclosure relates to a PBAT/aPHA composition (masterbatch) containing about 30-50 wt % of aPHA, or about 35-49 wt %, or about 40 to 48 wt %, or about 42 to 47 wt %, or about 43 to 46 wt %, based on the total amount of the masterbatch composition.

The above PBAT/aPHA masterbatch composition can be incorporated in traditional thermoplastic processing for producing PBAT products including injection molding, extrusion (blown, cast and oriented film, sheet, profile, etc.), fibers, spunbond fabrics, monofilaments, thermoforming, blow molding, compression molding and other thermoplastic processing operations.

In one embodiment, the method comprises producing a semi-crystalline PHA/aPHA masterbatch using two or more split feedings of the aPHA in mixing or blending or compounding operation. The method comprises feeding an entire amount of semi-crystalline PHA and about 1-15 wt %, or about 5-15 wt %, or about 10-15 wt % of aPHA based on the sum of total aPHA and total semi-crystalline PHA in the masterbatch in a primary feed; melting the primary feed; feeding about 30-49 wt %, or about 30-45 wt %, or about 35-45 wt % of aPHA based on the sum of total aPHA and total semi-crystalline PHA in the masterbatch to a secondary feed that is physically separated from the primary feed to combine the secondary feed and the melted primary feed; and dispersing aPHA of the secondary feed in the melted primary feed to obtain a masterbatch in which discrete aPHA particles are dispersed in the semi-crystalline PHA. The method optionally further comprises cooling the masterbatch. In an aspect, the melting is carried out at a temperature range of 140-200° C., or 150-190° C., or 160-180° C. In an aspect, the dispersing is carried out at a temperature lower than the temperature of the melting step, for example, a temperature range of 130-180° C., or 140-170° C., or 150-160° C.

In one embodiment, the present disclosure relates to a semi-crystalline PHA/aPHA composition (masterbatch) containing about 30-50 wt % of aPHA, or about 35-49 wt %, or about 40 to 48 wt %, or about 42 to 47 wt %, or about 43 to 46 wt %, based on the total amount of the masterbatch composition.

The above semi-crystalline PHA/aPHA masterbatch composition can be incorporated in traditional thermoplastic processing for producing semi-crystalline PHA products including injection molding, extrusion (blown, cast and oriented film, sheet, profile, etc.), fibers, spunbond fabrics, monofilaments, thermoforming, blow molding, compression molding and other thermoplastic processing operations.

In the above-discussed embodiments, the discrete aPHA particles dispersed in the continuous amorphous or semi-crystalline polymer may have an average diameter of less than 3 μm. In some embodiments, the discrete aPHA particles dispersed in the continuous amorphous or semi-crystalline polymer may have an average diameter of about 0.001 μm-3 μm, about 0.01 μm to 3 μm, about 0.05 μm to 2 μm, about 0.1 μm to 1 μm, or about 0.001 μm to 2 μm. In some embodiments, the average diameter of the discrete aPHA particles dispersed in the continuous amorphous or semi-crystalline polymer may be less than 2 μm, or less than 1 μm, or less than 0.5 μm, or less than 0.1 μm, or 0.01 to 0.1 μm, or 0.02 to 0.09 μm, or 0.03 to 0.08 μm, or 0.04 to 0.07 μm, or 0.05 to 0.06 μm.

According to the embodiments of the present disclosure, the split feeding of aPHA makes it possible to simultaneously achieve high loadings of aPHA in the resulting masterbatch, while maintaining acceptable residence times (and thus minimize the aPHA degradation) and mechanically acceptable torque. If the entire aPHA or a large portion of aPHA outside the above ranges is added downstream of the process, the melt temperature of the carrier polymer would drop greatly resulting in high viscosity of the carrier polymer and excessive power draw on the motor. On the other hand, if the entire aPHA or a large amount of aPHA outside the above ranges is added together with a carrier polymer or upstream of the process, the residence time of aPHA becomes longer, resulting in more degradation of aPHA. Specifically, the present disclosure relates to the following items.

Item 1. A method of producing a masterbatch comprising an amorphous or semi-crystalline polymer and amorphous polyhydroxyalkanoate (aPHA) dispersed in the amorphous or semi-crystalline polymer in a blending operation, the method comprising:

feeding the amorphous or semi-crystalline polymer and about 1-15 wt %, based on a sum of total aPHA and total amorphous or semi-crystalline polymer in the masterbatch, of aPHA to a primary feed;

melting the primary feed;

feeding about 30-49 wt %, based on the sum of the total aPHA and the total amorphous or semi-crystalline polymer in the masterbatch, of aPHA to a secondary feed that is physically separated from the primary feed to combine the secondary feed and the melted primary feed, and dispersing aPHA of the secondary feed in the melted primary feed to obtain the masterbatch in which discrete aPHA particles are dispersed in the amorphous or semi-crystalline polymer.

Item 2. The method according to Item 1, wherein the masterbatch comprises about 30-50 wt % of the aPHA and about 50-70 wt % of the crystalline polymer, based on the total amount of the masterbatch.

Item 3. The method according to Item 1, wherein the amorphous or semi-crystalline polymer is selected from the group consisting of polylactic acid (PLA), polybutylene succinate (PBS), aliphatic-aromatic polyesters such as polybutylene adipate terephthalate (PBAT), semi-crystalline polyhydroxyalkanoate (PHA), polyethylene-succinate (PES), polycaprolactone (PCL), and a combination thereof.

Item 4. The method according to Item 1, wherein the blending operation is carried out by a twin-screw extruder.

Item 5. The method according to Item 1, wherein the melting is carried out at a temperature range of 155-220° C.

Item 6. The method according to Item 1, wherein the dispersing is carried out at a temperature range of 140-180° C.

Item 7. The method according to Item 1, further comprising, after the dispersing, cooling a dispersion obtained by dispersing aPHA of the secondary feed in the melted primary feed.

Item 8. The method according to Item 1, wherein the discrete aPHA particles have an average diameter of less than 3 µm.

Item 9. The method according to Item 1, wherein the aPHA comprises a poly 3-hydroxybutyrate (P3HB) copolymer.

Item 10. The method according to Item 9, wherein the P3HB copolymer is a poly 3-hydroxybutyrate-co-3-hydroxypropionate (PHB3HP), poly 3-hydroxybutyrate-co-4-hydroxybutyrate (PHB4HB), poly 3-hydroxybutyrate-co-4-hydroxyvalerate (PHB4HV), poly 3-hydroxybutyrate-co-3-hydroxyvalerate (PHB3HV), poly 3-hydroxybutyrate-co-3-hydroxyhexanoate (PHB3HH), or a poly 3-hydroxybutyrate-co-5-hydroxyvalerate (PHB5HV).

Item 11. The method according to Item 1, wherein the aPHA is a PHA copolymer comprising about 50%-80% by weight of 3-hydroxybutyrate monomer units and about 20%-50% by weight of one or more of the hydroxyalkanoate monomer units selected from the group consisting of 3-hydroxyvalerate, 3-hydroxyhexanoate, 3-hydroxyoctanoate, 3-hydroxydecanoate, 3-hydroxydodecanoate and 4-hydroxybutyrate.

Item 12. The method according to item 1, wherein the aPHA is a PHA copolymer comprising about 55%-75% by weight of 3-hydroxybutyrate monomer units and about 25%-45% by weight of one or more of the hydroxyalkanoate monomer units selected from the group consisting of 3-hydroxyvalerate, 3-hydroxyhexanoate, 3-hydroxyoctanoate, 3-hydroxydecanoate, 3-hydroxydodecanoate and 4-hydroxybutyrate.

Item 13. A masterbatch composition comprising continuous amorphous or semi-crystalline polymer and discrete amorphous polyhydroxyalkanoate (aPHA) dispersed in the continuous amorphous or semi-crystalline polymer, wherein the aPHA is contained in an amount of about 30 to 50 wt % based on a total weight of the masterbatch composition, wherein the masterbatch is produced by the method according to Item 1.

Item 14. The masterbatch composition according to Item 13, wherein the amorphous or semi-crystalline polymer is selected from the group consisting of polylactic acid (PLA), polybutylene succinate (PBS), aliphatic-aromatic polyesters such as polybutylene adipate terephthalate (PBAT), crystalline polyhydroxyalkanoate (PHA), polyethylene-succinate (PES), polycaprolactone (PCL), and a combination thereof.

Item 15. The masterbatch composition according to Item 13, comprising 40 wt % or greater and less than 50 wt % of aPHA based on the total weight of the masterbatch composition.

Item 16. The masterbatch according to Item 13, wherein the discrete aPHA particles have an average diameter of less than 3 µm.

Item 17. The masterbatch according to Item 13, wherein the aPHA comprises a poly 3-hydroxybutyrate (P3HB) copolymer.

Item 18. The masterbatch according to Item 13, wherein the aPHA is a PHA copolymer comprising about 50%-80% by weight of 3-hydroxybutyrate monomer units and about 20%-50% by weight of one or more of the hydroxyalkanoate monomer units selected from the group consisting of 3-hydroxyvalerate, 3-hydroxyhexanoate, 3-hydroxyoctanoate, 3-hydroxydecanoate, 3-hydroxydodecanoate and 4-hydroxybutyrate.

Item 19. A method of preparing an amorphous or semi-crystalline polymer product comprising adding the amorphous or semi-crystalline polymer/amorphous polyhydroxyalkanoate (aPHA) masterbatch composition according to Item 13 into the amorphous or semi-crystalline polymer to obtain a mixture and subjecting the mixture to injection molding, extrusion, thermoforming, blow molding, or compression molding.

BRIEF DESCRIPTION OF THE DRAWINGS

FIG. 2 is a SEM picture of cyrofractured PLA/aPHA masterbatch showing discrete aPHA particles (1) dispersed into continuous PLA (2).

DETAILED DESCRIPTION OF THE DISCLOSURE

Polyhydroxyalkanoates (PHAs)

Figure 1:
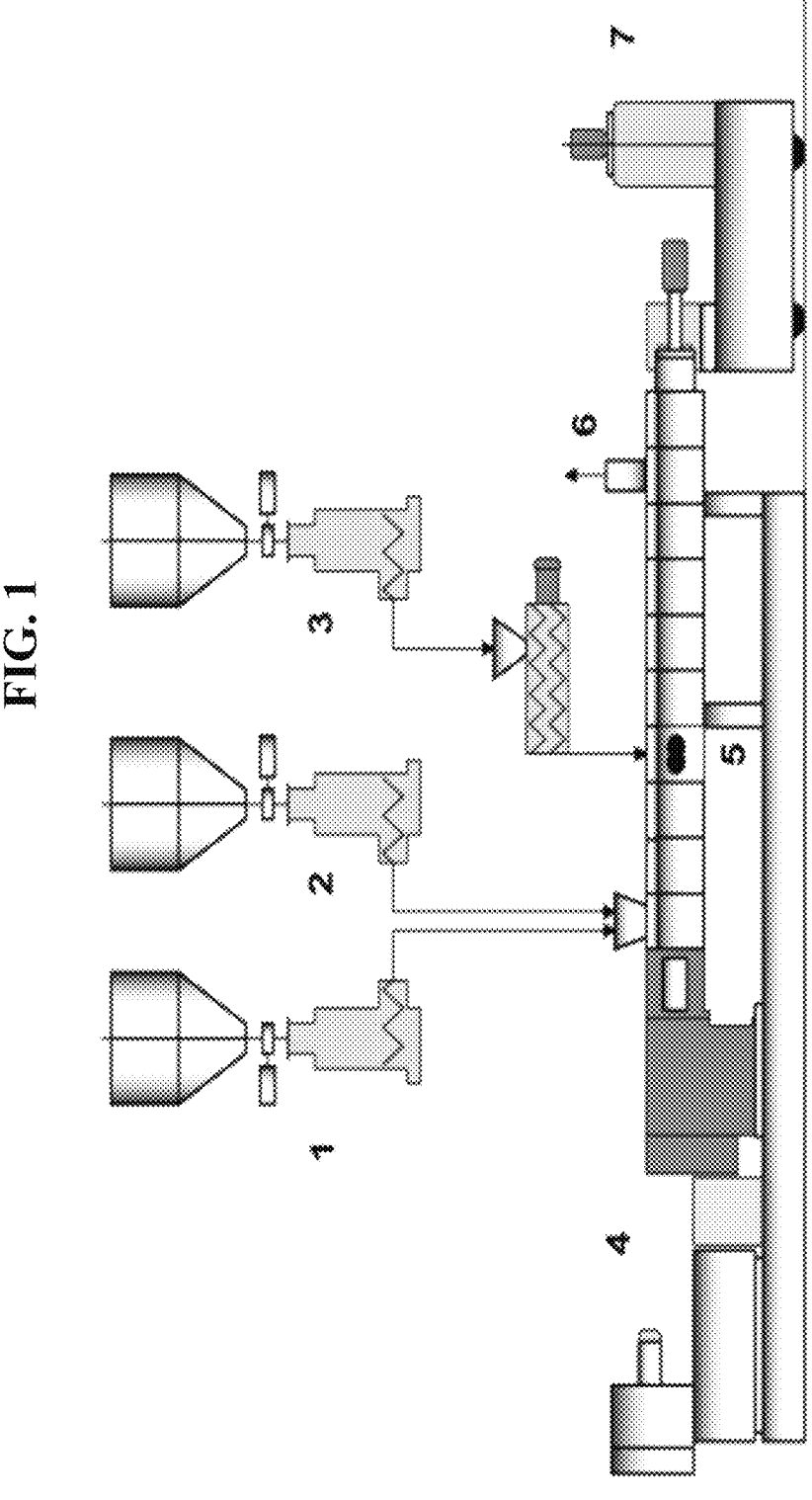
FIG. 1 is a schematic illustration of a twin screw extruder showing a non-limiting exemplary split feed of aPHA according to an embodiment.

Polyhydroxyalkanoates are biological polyesters synthesized by a broad range of natural and genetically engineered bacteria as well as genetically engineered plant crops. These polymers are biodegradable thermoplastic materials, produced from renewable resources, with the potential for use in a broad range of industrial applications. Useful microbial strains for producing PHAs, include *Alcaligenes eutrophus* (renamed as *Ralstonia eutropha*), *Alcaligenes latus, Azotobacter, Aeromonas, Comamonas*, Pseudomonads, and genetically engineered organisms including genetically engineered microbes such as *Pseudomonas, Ralstonia* and *Escherichia coli.*

In general, a PHA is formed by enzymatic polymerization of one or more monomer units inside a living cell. Over 100 different types of monomers have been incorporated into the PHA polymers (Steinbuchel and Valentin, 1995, FEMS Microbiol. Lett. 128; 219-228. Examples of monomer units incorporated in PHAs include 2-hydroxybutyrate, lactic acid, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HHep), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center.

In some embodiments, the PHA is a homopolymer (where all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as P3HB) and poly 3-hydroxyvalerate (hereinafter referred to as P3HV), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)).

In certain embodiments, the PHA is a copolymer (contain two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as P3HB4HB), poly 3-hydroxybutyrate-co-4-hydroxyvalerate (hereinafter referred to as P3HB4HV), poly 3-hydroxybutyrate-co-3-hydroxyvalerate (hereinafter referred to as P3HB3HV), poly 3-hydroxybutyrate-co-3-hydroxyhexanoate (hereinafter referred to as P3HB3HH) and poly 3-hydroxybutyrate-co-5-hydroxyvalerate (hereinafter referred to as P3HB5HV). By selecting the monomer types and controlling the ratios of the monomer units in a given PHA copolymer a wide range of material properties are achieved. Although examples of PHA copolymers having two different monomer units have been provided, the PHA can have more than two different monomer units (e.g., three different monomer units, four different monomer units, five different monomer units, six different monomer units). An example of a PHA having 4 different monomer units would be PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least about 70% by weight of the total monomers, preferably about 85% by weight of the total monomers, most preferably greater than about 90% by weight of the total monomers for example about 92%, 93%, 94%, 95%, 96% by weight of the copolymer and the HX comprises one or more monomers selected from 3HH, 3HO, 3HD, 3HDd.

Amorphous PHAs can be produced by known methods such as the process described in U.S. Pat. No. 6,228,934 and U.S. Patent Application Publication No. 2013/0225761A, of which the entire contents are incorporated by reference herein. In one embodiment, the aPHA may be an aPHA copolymer comprising about 50%-80%, preferably about 55%-75%, or about 60%-70%, by weight of 3-hydroxybutyrate monomer units and about 20%-50%, preferably about 25%-45%, or about 30%-40%, by weight of one or more of the hydroxyalkanoate monomer units selected from the group consisting of 3-hydroxyvalerate, 3-hydroxyhexanoate, 3-hydroxyoctanoate, 3-hydroxydecanoate, 3-hydroxydodecanoate and 4-hydroxybutyrate. In one embodiment, the aPHA may be an aPHA copolymer comprising about 50%-80%, preferably about 55%-75%, or about 60%-70%, by weight of 3-hydroxybutyrate monomer units and about 20%-50%, preferably about 25%-45%, or about 30%-40%, by weight of 4-hydroxybutyrate.

One non-limiting example of commercial aPHAs is a PHA copolymer such as P3HB4HB containing 30% or greater content of 4HB. For the P3HB4HB, the content of 4HB determines the semicrystalline structure (4HB of 1-20 wt %, or 5-15 wt %) or amorphous PHA (4HB of 20-50 wt %). A homopolymer of 3HB 100% (P3HB) is crystalline, and is brittle and has high thermal resistance. Amorphous PHA is flexible and tough, and shows low thermal resistance.

Molecular Weight of PHA

Physical properties and rheological properties of polymeric materials depend on the molecular weight and distribution of the polymer. "Molecular weight" is calculated in a number of different ways. Unless otherwise indicated, "molecular weight" refers to weight average molecular weight.

"Number average molecular weight" (Mn) represents the arithmetic mean of the distribution, and is the sum of the products of the molecular weights of each fraction, multiplied by its mole fraction ($\Sigma NiMi/\Sigma Ni$).

"Weight average molecular weight" (Mw) is the sum of the products of the molecular weight of each fraction, multiplied by its weight fraction ($\Sigma NiMi \, 2/\Sigma NiMi$). Mw is generally greater than or equal to Mn.

In determining the molecular weight techniques such as gel permeation chromatography (GPC) is used. In the methodology, a polystyrene standard is utilized. The PHA can have a polystyrene equivalent weight average molecular weight (in daltons) of at least about 500, at least about 10,000, or at least about 50,000 and/or less than about 2,000,000, less than about 1,000,000, less than about 1,500,000, and less than about 800,000. In certain embodiments, preferably, the PHAs generally have a weight-average molecular weight in the range of about 100,000 to about 700,000. For example, the molecular weight range for PHB and Type 1 PHB copolymers for use in this application is in the range of about 400,000 daltons to about 1.5 million daltons as determined by GPC method and the molecular weight range for Type 2 PHB copolymers for use in the application is about 100,000 to about 1.5 million daltons.

The method according to embodiments allows a minimum loss of molecular weight of the aPHA. According to non-limiting embodiments of the process according to the present disclosure, the molecular weight of aPHA in the masterbatch is maintained substantially the same as starting aPHA. In some non-limiting embodiments, the molecular weight of aPHA in the masterbatch may range at least 90% of the molecular weight of starting aPHA in the primary feed or the secondary feed. In some non-limiting embodiments, the molecular weight of aPHA in the masterbatch may range at least 95% of the molecular weight of starting aPHA in the primary feed or the secondary feed. In some non-limiting embodiments, the molecular weight of aPHA in the masterbatch may range at least 96% of the molecular weight of starting aPHA in the primary feed or the secondary feed. In some non-limiting embodiments, the molecular weight of aPHA in the masterbatch may range at least 97% of the molecular weight of starting aPHA in the primary feed or the secondary feed. In some non-limiting embodiments, the molecular weight of aPHA in the masterbatch may range at least 98% of the molecular weight of starting aPHA in the primary feed or the secondary feed. In some non-limiting embodiments, the molecular weight of aPHA in the masterbatch may range at least 99% of the molecular weight of starting aPHA in the primary feed or the secondary feed.

Additives

In certain embodiments, various additives is added to the PHA described above. Examples of these additives include antioxidants, pigments, UV stabilizers, fillers, plasticizers, nucleating agents, and radical scavengers.

Exemplary additives include, e.g., plasticizers (e.g., to increase flexibility of a thermoplastic composition), antioxidants (e.g., to protect the thermoplastic composition from degradation by ozone or oxygen), ultraviolet stabilizers (e.g., to protect against weathering), lubricants (e.g., to reduce friction), pigments (e.g., to add color to the thermoplastic composition), flame retardants, fillers, reinforcing, mold release, and antistatic agents. It is well within the skilled practitioner's abilities to determine whether an additive should be included in a thermoplastic composition and, if so, what additive and the amount that should be added to the composition.

In poly-3-hydroxybutyrate compositions, for example, plasticizers are often used to change the glass transition temperature and modulus of the composition, but surfactants may also be used. Lubricants may also be used, e.g., in injection molding applications. Plasticizers, surfactants and lubricants may all therefore be included in the overall composition.

In other embodiments, the composition includes one or more plasticizers. The plasticizers may be used either alone respectively or in combinations with each other.

In certain embodiments, the compositions and methods of the disclosure can optionally include one or more surfactants. Surfactants are generally used to de-dust, lubricate, reduce surface tension, and/or densify. Examples of surfactants include, but are not limited to mineral oil, castor oil, and soybean oil. One mineral oil surfactant is DRAKE™ 34, available from PENRECO (Dickinson, Tex., USA). MAXSPERSE™ W-6000 and W-3000 solid surfactants are available from CHEMAX Polymer Additives (Piedmont, S.C., USA). Non-ionic surfactants with HLB values ranging from about 2 to about 16 can be used, examples being TWEEN™-20, TWEEN™-65, SPAN™-40 and SPAN™-85.

One or more lubricants can also be added to the compositions and methods of the invention. Lubricants are normally used to reduce sticking to hot processing metal surfaces and can include polyethylene, paraffin oils, and paraffin waxes in combination with metal stearates. Other lubricants include stearic acid, amide waxes, ester waxes, metal carboxylates, and carboxylic acids. Lubricants are normally added to polymers in the range of about 0.1 percent to about 1 percent by weight, generally from about 0.7 percent to about 0.8 percent by weight of the compound. Solid lubricants is warmed and melted before or during processing of the blend.

Nucleating Agents

For instance, an optional nucleating agent is added to the PHA to aid in its crystallization. Nucleating agents for various polymers are simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, metal salts of organophosphates, and boron nitride; low-molecular organic compounds having a metal carboxylate group, for example, metal salts of such as octylic acid, toluic acid, heptanoic acid, pelargonic acid, lauric acid, myristic acid, palmitic acid, stearic acid, behenic acid, cerotic acid, montanic acid, melissic acid, benzoic acid, p-tert-butylbenzoic acid, terephthalic acid, terephthalic acid monomethyl ester, isophthalic acid, and isophthalic acid monomethyl ester; high-molecular organic compounds having a metal carboxylate group, for example, metal salts of such as: carboxyl-group-containing polyethylene obtained by oxidation of polyethylene; carboxyl-group-containing polypropylene obtained by oxidation of polypropylene; copolymers of olefins, such as ethylene, propylene and butene-1, with acrylic or methacrylic acid; copolymers of styrene with acrylic or methacrylic acid; copolymers of olefins with maleic anhydride; and copolymers of styrene with maleic anhydride; high-molecular organic compounds, for example: alpha-olefins branched at their 3-position carbon atom and having no fewer than 5 carbon atoms, such as 3,3 dimethylbutene-1, 3-methylbutene-1,3-methylpentene-1,3-methylhexene-1, and 3,5,5-trimethylhexene-1; polymers of vinylcycloalkanes such as vinylcyclopentane, vinylcyclohexane, and vinylnorbornane; polyalkylene glycols such as polyethylene glycol and polypropylene glycol; poly(glycolic acid); cellulose; cellulose esters; and cellulose ethers; phosphoric or phosphorous acid and its metal salts, such as diphenyl phosphate, diphenyl phosphite, metal salts of bis(4-tert-butylphenyl) phosphate, and methylene bis-(2,4-tert-butylphenyl)phosphate; sorbitol derivatives such as bis(p-methylbenzylidene) sorbitol and bis(p-ethylbenzylidene) sorbitol; and thioglycolic anhydride, p-toluenesulfonic acid and its metal salts. The above nucleating agents may be used either alone or in combinations with each other. In particular embodiments, the nucleating agent is cyanuric acid. In certain embodiments, the nucleating agent can also be another polymer (e.g., polymeric nucleating agents such as PHB).

In certain embodiments, the nucleating agent is selected from: cyanuric acid, carbon black, mica talc, silica, boron nitride, clay, calcium carbonate, synthesized silicic acid and salts, metal salts of organophosphates, and kaolin. In particular embodiments, the nucleating agent is cyanuric acid.

In various embodiments, where the nucleating agent is dispersed in a liquid carrier, the liquid carrier is a plasticizer, e.g., a citric compound or an adipic compound, e.g., acetylcitrate tributyrate (CITROFLEX™ A4, Vertellus, Inc., High Point, N.C.), or DBEEA (dibutoxyethoxyethyl adipate), a surfactant, e.g., TRITON™ X-100, TWEEN™-20, TWEEN™-65, SPAN™-40 or SPAN™ 85, a lubricant, a volatile liquid, e.g., chloroform, heptane, or pentane, an organic liquid or water.

In other embodiments, the nucleating agent is aluminum hydroxy diphosphate or a compound comprising a nitrogen-containing heteroaromatic core. The nitrogen-containing heteroaromatic core is pyridine, pyrimidine, pyrazine, pyridazine, triazine, or imidazole.

In film applications of the compositions and methods described herein, anti-block masterbatch is also added. A suitable example is a slip anti-block masterbatch mixture of erucamide (about 20% by weight) diatomaceous earth (about 5% by weight) nucleant masterbatch (about 3% by weight), pelleted into PHA (about 62% by weight). Others are known to those of ordinary skill in the field of polymer processing.

Masterbatch Manufacturing Process and Apparatus

The masterbatch composition may be produced by a process called "compounding." Compounding combines mixing and blending techniques during a heat process, in order to ensure uniformity, homogeneity and dispersion in the final compound. Such compounding process may be carried out with an extruder, such as single-screw extruders, twin-screw extruders, or multi-screw extruders of either co-rotating or counter-rotating design, dispersive kneaders, reciprocating single-screw extruder (co-kneaders).

In an exemplary embodiment, the extruder used for the production of the masterbatch composition is a multi-screw extruder, preferably a twin-screw extruder, more preferably a co-rotating twin-screw extruder. In a particular embodiment, the extruder further comprises, after the screws, a static mixer. In another embodiment, the extruder is used with a die pierced with holes, for example a two holes die.

In embodiments, the residence time of the mixture in the extruder is comprised between 5 seconds and 3 minutes, preferably is less than 2 minutes, more preferably less than 1 minute. When the masterbatch comprises a polymer with a melting temperature below 180° C., the residence time of the mixture in the extruder is preferably less than 2 minutes.

One skilled in the art will easily adapt the characteristics of the extruder (e.g., the length and diameter of the strew(s), etc.), and the residence time to the aPHA polymer and the amorphous or semi-crystalline polymer, the additives, and the type of masterbatch composition intended.

In exemplary embodiments, a masterbatch of about 30 to 50 wt % of aPHA in an amorphous or semi-crystalline polymer such as PLA, PBS, PBAT, PES, PCL, and semi-crystalline PHA is manufactured. The amorphous or semi-crystalline polymer must be maintained as the continuous phase, therefore it is melted first and is equal to or greater than about 50 wt % of the final product.

The masterbatch approach reduces the overall heat history of the final product produced. Typically, virgin polymer is mixed at line (upfront) (as opposed to "in line" (during conversion)) in the final conversion step reducing the overall heat history and allowing for increased final MW and melt strength in processing.

A masterbatch allows the flexibility to the end user to easily change the amount of additive used for different applications using just one product.

A masterbatch reduces the overall cost compared to fully compounded solution.

In one aspect, the masterbatch is made in a twin-screw extruder. A twin screw extruder is a machine consisting of two intermeshing, co-rotating screws mounted on splined shafts in a closed barrel. The screws are tight and self-wiping, which eliminates stagnant zones over the entire length of the process section. Co-rotating, intermeshing twin-screw extruders utilize a modular design for barrels and screws. By sequencing barrel modules and screw elements for different process tasks (i.e. downstream addition of fillers and fibers, degassing, etc.) the extruder can be adapted to a wide variety of processes.

The amorphous or semi-crystalline polymer is typically melted first in the early zones (barrels) of the extruder. This is important in order to ensure the amorphous or semi-crystalline polymer is the continuous phase. Typically, aPHA has a very low or no melting point. If it were fed in the primary feed hopper it would melt or soften first incorporating the amorphous or semi-crystalline polymer and prevent it from melting properly. aPHA is fed downstream using a side stuffing feeder. aPHA feed is split for heat balance purposes but it is important to make sure the bulk is fed downstream to ensure the amorphous or semi-crystalline polymer is the continuous phase.

The method comprises two or more split feedings of the aPHA in a twin-screw extrusion operation. The method comprises feeding an entire amount of semi-crystalline PHA and about 1-15 wt %, or about 5-15 wt %, or about 10-15 wt % of aPHA based on the sum of total aPHA and total semi-crystalline PHA in the masterbatch in a primary feed; melting the primary feed; feeding about 30-49 wt %, or about 30-45 wt %, or about 35-45 wt % of aPHA based on the sum of total aPHA and total semi-crystalline PHA in the masterbatch to a secondary feed that is physically separated from the primary feed to combine the secondary feed and the melted primary feed; and dispersing aPHA of the secondary feed in the melted primary feed to obtain a masterbatch in which discrete aPHA particles are dispersed in the semi-crystalline PHA. The method optionally further comprises cooling the masterbatch.

A non-limiting exemplary equipment that can be employed for manufacturing the masterbatch according to one embodiment is depicted in FIG. 1.

Referring to FIG. 1, an exemplary equipment may have a twin screw extruder 4, which has a primary feeder containing a feeder 1 to introduce an amorphous or semi-crystalline polymer in its entire portion and a feeder 2 to introduce a part of aPHA, as a primary feed that is heated to a melted state and a secondary feeder 3 to introduce a remainder of aPHA to the melted primary feed. The extruder has a side feeder 5 and a cooling member such as a vacuum vent 6 and underwater pelletizer 7. A mixture of an amorphous or semi-crystalline polymer and a first feed of aPHA is added as a primary feed in the extruder through the primary feeder. The primary feed is then heated for melting. The melting temperature for the mixture is about 155-220° C., or about 165-210° C. or about 175-200° C., or about 180-190° C. The second feed of aPHA is added to the melted primary feed (a molten mixture of the amorphous or semi-crystalline polymer and the first feed of aPHA) through the secondary feeder that is physically separated from the primary feeder, and is dispersed in the melted primary feed. The dispersion temperature is about 140-180° C., or about 145-175° C., or about 150-170° C., or about 155-165° C. The dispersed mixture may be then cooled down at a temperature below about 140° C., or below about 130° C., or below about 120° C., or below about 110° C., or below about 100° C. The twin screw extruder can be operated at about 200-400 rpm, or about 225-375 rpm, or about 250-350 rpm, or about 275 to 325 rpm.

For different amorphous or semi-crystalline polymers, the heating profile can be set appropriate according to their molecular weight and/or melting point, within the ranges described above.

The present method produces an amorphous or semi-crystalline polymer/aPHA composition (masterbatch) containing about 30-50 wt % of aPHA, or about 35-49 wt %, or about 40 to 48 wt %, or about 42 to 47 wt %, or about 43 to 46 wt %, based on the total weight of the masterbatch composition.

The amorphous or semi-crystalline polymer includes, but is not limited to, PLA, PBS, aliphatic-aromatic polyesters such as PBAT, PES, PCL, semi-crystalline PHA, or a combination thereof. Commercially available PLA, PBS, aliphatic-aromatic polyesters such as PBAT, PES, PCL, or semi-crystalline PHA may be suitably used.

Application of Masterbatch

The above amorphous or semi-crystalline polymer/aPHA masterbatch composition can be incorporated in traditional thermoplastic processing for producing the polymer products including injection molding, extrusion (blown, cast and oriented film, sheet, profile, etc.), fibers, spunbond fabrics, monofilaments, thermoforming, blow molding, compression molding and other thermoplastic processing operations.

For the fabrication of useful articles, the amorphous or semi-crystalline polymer/aPHA masterbatch is processed at a typically near the glass transition temperature (Tg) or the crystalline melting point of the amorphous or semi-crystalline polymer to minimize molecular weight loss. Additives are choses to be stable at these temperatures. While melted, the polymeric composition is processed into a desired shape, and subsequently cooled to set the shape and induce crystallization as needed. Such shapes can include, but are not limited to, a fiber, filament, film, sheet, rod, tube, bottle, or other shape. Such processing is performed using any art-known technique, such as, but not limited to, extrusion, injection molding, compression molding, blowing or blow molding (e.g., blown film, blowing of foam), calendaring, rotational molding, casting (e.g., cast sheet, cast film), or thermoforming.

The masterbatch is used to create, without limitation, a wide variety of useful products, e.g., automotive, consumer durable, construction, electrical, medical, and packaging products. For instance, the polymeric compositions is used to make, without limitation, films (e.g., packaging films including food packaging films, agricultural film, mulch film, fertilizer coating, shopping bags, erosion control, hay bale wrap, slit film, food wrap, pallet wrap, protective automobile and appliance wrap, etc.), golf tees, caps and closures, agricultural supports and stakes, paper and board coatings (e.g., for cups, cardboard, plates, boxes, etc.), thermoformed products (e.g., trays, containers including food container, lids, yoghurt pots, cup lids, plant pots, noodle bowls, moldings, etc.), housings (e.g., for electronics items, e.g., cell phones, PDA cases, music player cases, computer cases and the like), bags (e.g., trash bags, grocery bags, food bags, compost bags, etc.), hygiene articles (e.g.,

EXAMPLES

The following examples are provided for illustrative purposes only and are in no way intended to limit the scope of the invention.

Example 1

A blend (masterbatch) of aPHA/PLA was prepared using a 27 mm MAXX Leistritz co-rotating twin-screw extruder with a heating profile as shown in the following table, with cooling downstream to minimize MW loss of aPHA.

| | 1 | 2 | 3 | 4 | 5 | 6 | 7 | 8 | 9 | 10 | 11 | UWG | Water |
|---|---|---|---|---|---|---|---|---|---|---|---|---|---|
| Barrel T/C | x | x | x | x | x | x | x | x | x | x | x | x | |
| Heating type | elec | elec | elec | elec | elec | elec | elec | elec | elec | elec | elec | elec | elec |
| Cooling Type | $H_2O$ | $H_2O$ | $H_2O$ | $H_2O$ | $H_2O$ | $H_2O$ | $H_2O$ | $H_2O$ | $H_2O$ | $H_2O$ | $H_2O$ | | $H_2O$ |
| Barrel Set Temps ° C. | 100 | 185 | 185 | 185 | 160 | 154 | 143 | 127 | 127 | 127 | 127 | 193 | 49 |
| Melt Temperature ° C. | | | | | | | | | | | 185-195 | 185-195 | |

UWG: Underwater Pelletizer diapers, feminine hygiene products, incontinence products, disposable wipes, etc.), coatings for pelleted products (e.g., pelleted fertilizer, herbicides, pesticides, seeds, etc.), injection moldings (writing instruments, utensils, disk cases, etc.), solution and spun fibers and melt blown fabrics and non-wovens (threads, yarns, wipes, wadding, disposable absorbent articles), blow moldings (deep containers, bottles, etc.), foamed articles (cups, bowls, plates, packaging, etc.), fishing net, cosmetic container, 3D printing filament and the like.

Thermoforming is a process that uses films or sheets of thermoplastic. The polymeric composition is processed into a film or sheet. The sheet of polymer is then placed in an oven and heated. When soft enough to be formed it is transferred to a mold and formed into a shape.

Molded products include a number of different product types and, for example, including products such as disposable spoons, forks and knives, tubs, bowls, lids, cup lids, yogurt cups, and other containers, bottles and bottle-like containers, etc.

Blow molding, which is similar to thermoforming and is used to produce deep draw products such as bottles and similar products with deep interiors.

The masterbatch described herein are provided in any suitable form convenient for an intended application. For example, the masterbatch is provided in pellet form to subsequently produce films, coatings, moldings or other articles, or the films, coatings, moldings The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are hereby incorporated by reference in their entireties.

A mixture of 550 g of PLA (available from Natureworks, 4032D™) and aPHA (available from CJ Biomaterials Corporation, PHACT™ A1000P) is fed in primary feed (here, barrel #1). The mixture contained aPHA in an amount of 15 wt % based on the total of aPHA and the total of PLA of 1000 g. 30 wt % of aPHA based on the total of aPHA and the total of PLA was fed in secondary feed (here, barrel #6) to the molten mixture of PLA and aPHA. A series of mixing elements were designed to shear the aPHA and disperse it into micron sized domains. The residence time of the mixture in the extruder was about 1 minute. The extruder was operated at 300 rpm. aPHA was well dispersed in the master, as shown in FIG. 2.

Figure 2:
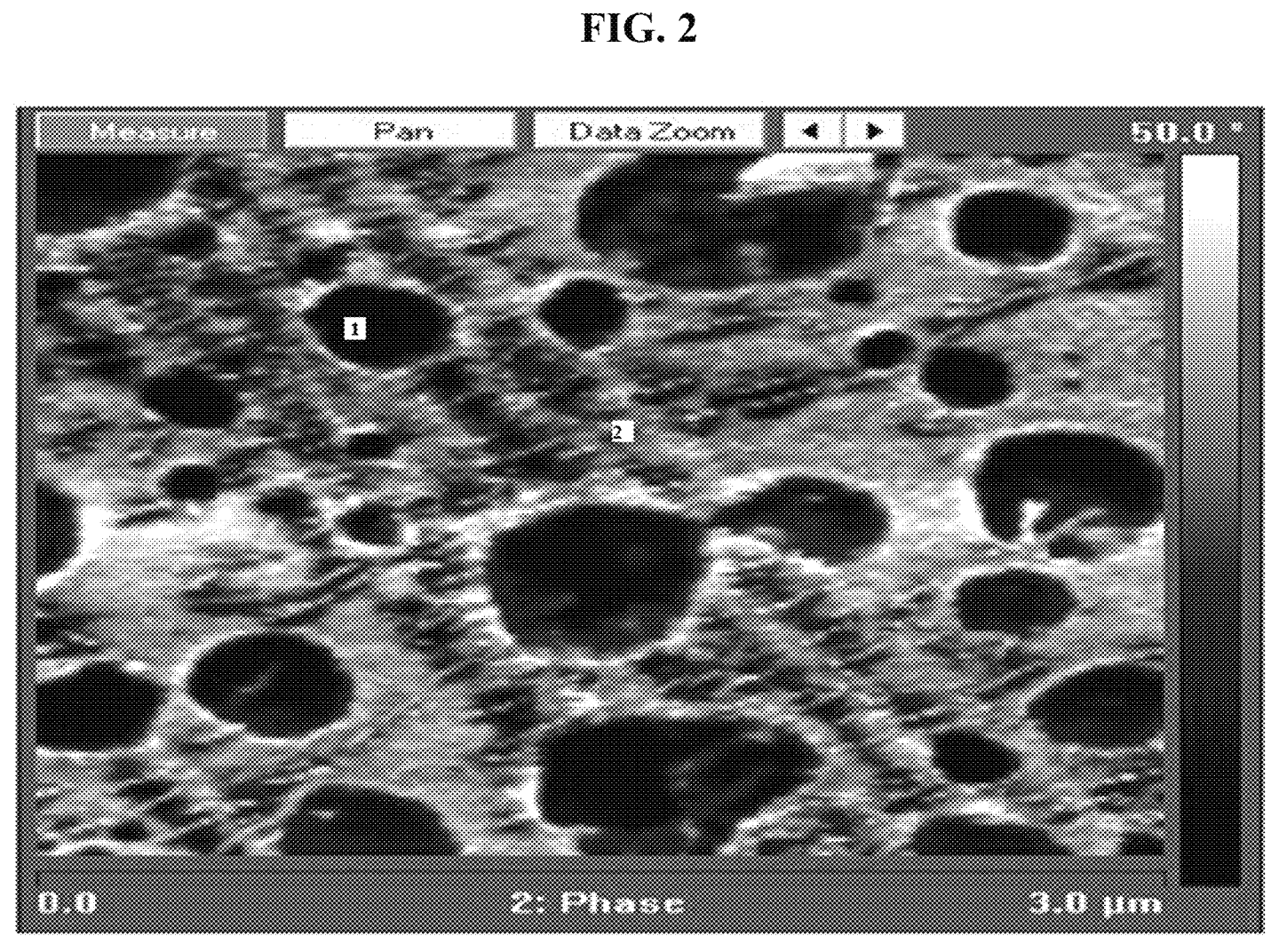

FIG. 2 is a SEM picture of cyrofractured PLA/aPHA masterbatch showing discrete aPHA particles (1) dispersed into PLA (2).

While the subject matter disclosed herein has been described in connection with what is presently considered to be practical example embodiments, it is to be understood that the present disclosure is not limited to the disclosed embodiments, and covers various modifications and equivalent arrangements included within the spirit and scope of the appended claims.

Other than in the examples herein, or unless otherwise expressly specified, all of the numerical ranges, amounts, values and percentages, such as those for amounts of materials, elemental contents, times and temperatures of reaction, ratios of amounts, and others, in the above portion of the specification and attached claims may be read as if prefaced by the word "about" even though the term "about" may not expressly appear with the value, amount, or range.

Accordingly, unless indicated to the contrary, the numerical parameters set forth in the above specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

What is claimed is:

1. A pelletized masterbatch composition comprising continuous amorphous or semi-crystalline polymer and discrete amorphous polyhydroxyalkanoate (aPHA) dispersed in the continuous amorphous or semi-crystalline polymer, wherein the aPHA is contained in an amount of about 30 to 50 wt % based on a total weight of the pelletized masterbatch composition, wherein the pelletized masterbatch is produced by a method comprising:

feeding the amorphous or semi-crystalline polymer and about 1-15 wt %, based on a sum of total aPHA and total amorphous or semi-crystalline polymer in the masterbatch, of aPHA to a primary feed;

melting the primary feed;

feeding about 30-49 wt %, based on the sum of the total aPHA and the total amorphous or semi-crystalline polymer in the masterbatch, of aPHA to a secondary feed that is physically separated from the primary feed to combine the secondary feed and the melted primary feed, and dispersing aPHA of the secondary feed in the melted primary feed to obtain a masterbatch melt, and cooling and pelletizing the masterbatch to obtain the pelletized mastertabch in which discrete aPHA particles are dispersed in the amorphous or semi-crystalline polymer, and wherein the amorphous or semi-crystalline polymer is selected from the group consisting of polylactic acid (PLA), polybutylene succinate (PBS), polybutylene adipate terephthalate (PBAT), polyethylene-succinate (PES), polycaprolactone (PCL), semi-crystalline polyhydroxyalkanoate (PHA), and a combination thereof, and wherein the discrete aPHA particles have an average diameter of less than 3 μm.

2. The pelletized masterbatch composition according to claim 1, comprising 40 wt % or greater and less than 50 wt % of aPHA based on the total weight of the pelletized masterbatch composition.

3. The pelletized masterbatch according to claim 1, wherein the aPHA comprises a poly 3-hydroxybutyrate (P3HB) copolymer.

4. The pelletized masterbatch according to claim 1, wherein the aPHA is an aPHA copolymer comprising about 50%-80% by weight of 3-hydroxybutyrate monomer units and about 20%-50% by weight of one or more of the hydroxyalkanoate monomer units selected from the group consisting of 3-hydroxyvalerate, 3-hydroxyhexanoate, 3-hydroxyoctanoate, 3-hydroxydecanoate, 3-hydroxydodecanoate and 4-hydroxybutyrate.

5. A method of preparing an amorphous or semi-crystalline polymer product comprising adding the amorphous or semi-crystalline polymer/amorphous polyhydroxyalkanoate (aPHA) masterbatch composition according to claim 1 into the amorphous or semi-crystalline polymer to obtain a mixture and subjecting the mixture to injection molding, extrusion, thermoforming, blow molding, or compression molding.

* * * * *